United States Patent [19]

Hemmati

[11] Patent Number: 4,974,230
[45] Date of Patent: Nov. 27, 1990

[54] TM,HO:YLF LASER END-PUMPED BY A SEMICONDUCTOR DIODE LASER ARRAY

[75] Inventor: Hamid Hemmati, Encino, Calif.

[73] Assignee: The United States of America as represented by the Administrator of the National Aeronautics and Space Administration, Washington, D.C.

[21] Appl. No.: 235,150

[22] Filed: Aug. 23, 1988

[51] Int. Cl.$^5$ .............................................. H01S 3/16
[52] U.S. Cl. ...................................... 372/41; 372/71; 372/75
[58] Field of Search ................................. 372/39–42, 372/66, 68, 69, 70, 75

[56] References Cited

U.S. PATENT DOCUMENTS

| | | | |
|---|---|---|---|
| 3,624,549 | 11/1971 | Geusie et al. | 331/94.5 |
| 3,753,145 | 8/1973 | Chesler | 331/94.5 |
| 3,866,142 | 2/1975 | Cline et al. | 372/41 |
| 3,949,319 | 4/1976 | Tofield et al. | 372/41 |
| 3,972,007 | 7/1976 | Naiman et al. | 371/41 |
| 3,984,524 | 10/1976 | Alexandrov et al. | 371/41 |
| 4,015,217 | 3/1977 | Snitzer | 372/70 |
| 4,044,315 | 8/1977 | Snitzer | 372/68 |
| 4,110,702 | 8/1978 | Chicklis | 331/94.5 |
| 4,176,326 | 11/1979 | Wittig et al. | 331/94.5 |
| 4,194,170 | 3/1980 | Kurnit | 331/94.5 |
| 4,227,159 | 10/1980 | Barrett et al. | 372/70 |
| 4,321,559 | 3/1982 | Esterowitz et al. | 372/41 |
| 4,330,763 | 5/1982 | Esterowitz et al. | 372/41 |
| 4,347,485 | 8/1982 | Esterowitz et al. | 372/42 |
| 4,461,006 | 7/1984 | Salour et al. | 372/35 |
| 4,710,940 | 12/1987 | Sipes | 372/75 |
| 4,713,820 | 12/1987 | Morris et al. | 372/41 |
| 4,797,893 | 1/1989 | Dixon | 372/41 |

OTHER PUBLICATIONS

E. P. Chicklis, et al., "Stimulated Emission in Multiply Doped Ho:YLF and YAG—A Comparison," IEEE Journal of Quantum Mechanics, vol. QE-8, No. 2, Feb. 1972, pp. 225–230.
D. L. Sipes, "Highly Efficient Neodymium:Yttrium Aluminum Garnet Laser End Pumped by a Semiconductor Laser Array," Appl. Phys. Lett. 47(2), pp. 74–76, Jul. 15, 1985.
B. Zhou, et al., "Efficient, Frequency-Stable Laser-Diode-Pumped Nd:YAG Laser," Optics Letters, vol. 10, No. 2, pp. 62–64, Feb. 1985.
D. L. Sipes, "Highly Efficient Nd:YAG Lasers for Free-Space Optical Communications TDS Progress Report", Jet Propulsion Laboratory, Pasadena, Calif., pp. 31–39, 1984.
T. Y. Fan, "Efficient GaAlAs Diode-Laser-Pumped Operation of Nd:YLF at 1.047 $\mu$m with Intracavity Droubling to 523.6 nm," Opt. lett. V. 4, 204 (1986).
R. Allen et al., "Diode-Pumped 2 $\mu$m Holmium Laser," Electronics, Lett., V. 22, 946 (1986).
R. Chesler, et al., "Miniature Diode-Pumped Nd:YAlG Lasers," Appl. Phys. Lett., vol. 23, No. 5, 235 (1973).
M. Saruwatari, et al., "Miniaturized cw LiNdP$_4$O$_{12}$ Laser Pumped with a Semiconductor Laser," Appl. Phys. Lett., vol. 29, No. 5, 291 (1976).
K. Washio, et al., "Room-Temperature cw Operation of An Efficient Miniaturized Nd:YAG Laser End-Pumped by a Superluminescent Diode," App. Phys. Lett., vol. 29, No. 11, pp. 72–74, Dec. 1976.
E. W. Duczynski, et al.,. "cw Double Cross Pumping of the 5/7–5/8 Laser Transition in Ho$^{3+}$-Doped Garnets," Appl. Phys. lett. 48(23), Jun. 1986, pp. 1562–1563.

*Primary Examiner*—Léon Scott, Jr.
*Attorney, Agent, or Firm*—Thomas H. Jones; John R. Manning

[57] ABSTRACT

A Ho:YLF crystal including Tm as sensitizers for the activator Ho, is optically pumped with a semiconductor diode laser array to generate 2.1 $\mu$m radiation with a pump power to output power of efficiency as high as 68%. The prior-art dual sensitizer system of Er and Tm requires cooling, such as by LN$_2$, but by using Tm alone and decreasing the concentrations of Tm and Ho, and decreasing the length of the laser rod to about 1 cm, it has been demonstrated that laser operation can be obtained from a temperature of 77° K. with an efficiency as high as 68% up to ambient room temperature with an efficiency at that temperature as high as 9%.

12 Claims, 3 Drawing Sheets

TM,HO:YLF LASER END-PUMPED BY A SEMICONDUCTOR DIODE LASER ARRAY

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to a Tm,Ho:YLF end-pumped laser, and more particularly to a Tm,Ho:YLF laser optically pumped with a 790 nm continuous wave (or pulsed) semiconductor diode laser array at room temperature.

BACKGROUND ART

Neodymium: yttrium aluminum garnet (Nd:YAG) crystals longitudinally pumped by semiconductor laser arrays have been established as a means of obtaining a moderate power continuous-wave (cw) laser emission at 1.06 $\mu$m. Such a laser excitation scheme is highly efficient, compact, long-lived, and frequency-stable. D. L. Sipes, "Highly efficient neodymium:yttrium aluminum garnet laser end pumped by a semiconductor laser array," Appl. Phys. Lett. V. 47, 74 (1985), and B. Zhou, T. J. Kane, G. J. Dixon and R. L. Byer, "Efficient, frequency-stable laser-diode-pumped Nd:YAG laser," Opt. Lett. V.10, 62 (1985). See also D. L. Sipes, "Highly Efficient Nd:YAG Lasers for Free-Space Optical Communications," TDA Progress Report 42-80, Jet Propulsion Laboratory, Pasadena, California, pp 31-39, Oct.--Dec. 1984.

There are potential advantages in the use of Nd:YLF as opposed to Nd:YAG, such as longer fluorescent lifetime and inherently polarized oscillation. T. J. Fan, G. J. Dixon and R. L. Byer, Opt. Lett. V.4, 204 (1986). A Holmium:Yttrium Aluminum Garnet (Ho:YAG) laser optically pumped by a diode-laser array was later reported by R. Allen, L. Esterowitz, L. Goldberg, and J. F. Fowler, Electronics Lett. "Diode-pumped 2 $\mu$m holmium laser," V.22, 947 (1986).

Holmium (Ho) solid-state lasers have been known for at least two decades, but have always had to be operated at very low temperatures (typically 77° K.) or with very high input powers to overcome the lasing threshold. E. P. Chicklis, C. S. Naiman, R. C. Folweiler and J. C. Doherty, "Stimulated Emission in Multiply Doped Ho$^{3+}$:YLF and YAG—A Comparison," IEEE J. Quantum Electron., Vol. QE-8, No. 2, 225 (1972) The lifetime of the upper Ho laser level ($^5I_7$) is approximately 12 ms. This value is about 50 times that of the corresponding metastable state of Nd:YAG (230 $\mu$s) which indicates a high storage capacity for the YLF material.

What has been sought since the early part of the previous decade is a laser that is power-efficient, compact, has a low lasing threshold, and operates at room temperature. The early work in quest of a solution to this need began with Nd lasers. R. B. Chesler and D. A. Draegert, "Miniature diode-pumped Nd:YAlG lasers," Appl. Phys. Lett., Vol. 23, No. 5, 235 (1973); M. Saruwatari, T. Kimura and K. Otsuka, "Miniaturized cw LiNdP$_4$O$_{12}$ laser pumped with a semiconductor laser," Appl. Phys. Lett., Vol. 29, No. 5, 291 (1976); K. Washio, K. Iwamoto, K. Inoue, I. Hino, S. Matsumoto and F. Saito, "Room-temperature cw operation of an efficient miniaturized Nd:YAG laser end-pumped by a superluminescent diode," Appl. Phys. Lett., Vol. 29, No. 11, 720 (1976). This search had not been extended to other activators besides Nd, and particularly not to Ho, until the present invention.

Ho solid-state lasers have been known for at least as long as this search has taken place for a miniaturized laser end-pumped by a semiconductor laser. See the 1972 IEEE paper by Chicklis, et al., in the Journal of Quantum Electronics cited above which compared Ho:YLF and Ho:YAG lasers sensitized by Er and Tm for high pumping efficiencies. But the comparisons were conducted with a xenon flashlamp for pumping at room temperature which necessarily means room-temperature operation at high input, broad spectrum input power. The conclusion reached was that YLF was the better host for Er,Tm,Ho because of its very high slope efficiency and low threshold.

It was not until 1986 that efficient Ho lasing was reported at room temperature. E. W. Duczynski, G. Huber, V. C. Ostroumov and I. A. Shcherbakov, "cw double cross pumping of the 5/7-5/8 laser transition in Ho$^{3+}$-doped garnets," Appl. Phys. Lett. 48(23) 1562 (1986). However, there Cr,Tm,Ho:YSGG and Cr,Tm,Ho:YSAG crystals were pumped with a Krypton laser with a suggestion that they be flashlamp pumped for efficient operation near 2 $\mu$m wavelength. That does not satisfy the need for a power-efficient, compact solid-state laser with a low lasing threshold for operation at room temperature.

STATEMENT OF THE INVENTION

An object of this invention is to provide an optically pumped Ho:YLF laser with a very high optical-to-optical conversion efficiency of pump power to laser output power.

A further object is to provide a pumped Ho:YLF laser operating at near room temperature with an output wavelength of 2.1 $\mu$m.

In accordance with the present invention, these and other objects of the invention are achieved by an optically pumped crystal laser using yttrium lithium fluoride (YLF) as the host and holmium (Ho) as the activator sensitized with Tm for efficient absorption of pump energy and then transfer to the activator. The crystal is optically pumped by a laser-diode array tuned to an output wavelength at about 792 nm and operating with a cw output power of about 400 mW. There is no limitation for significantly higher input powers. The Ho:YLF absorption band of the optically pumped laser around 792 nm is about 6 nm wide and well overlaps the 1 nm spectral width of the pump laser. Laser operation is obtained at near room temperature with moderate power (26 mW) and at 77° K. with as much as 182 mW of power. Pump to laser output power conversion efficiency is 63% at 77° K. and 9% at 300° K.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
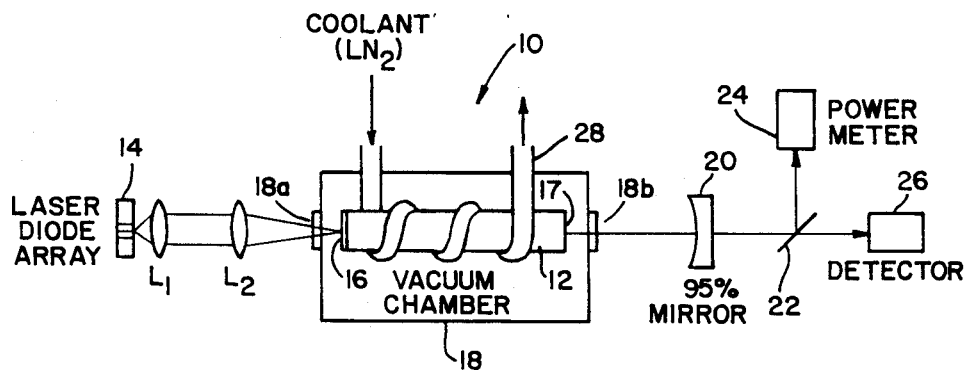
FIG. 1 illustrates schematically an arrangement for a 10 mm Er,Tm,Ho:YLF laser rod end-pumped by a cw semiconductor diode laser array.

Referring to FIG. 1, a schematic diagram of an experimental setup for a Ho:YLF crystal laser 10 is shown utilizing Er and Tm sensitizers in a crystal rod 12 that is 1 cm long and 0.5 cm square in cross section. The crystal rod is optically pumped by a cw semiconductor laser array 14. Both ends of the laser crystal rod 12 are polished flat and the pumped end of the crystal is covered with a coating 16 for high transmittance into the crystal at 0.79 $\mu$m and high reflectance inside the crystal at ~2.1 $\mu$m, while the other end 17 is antireflectance coated for radiation. The crystal rod 12 is enclosed in a vacuum chamber 18 having Dewar windows 18a and 18b. A 95% reflecting mirror 20 is provided outside of the vacuum chamber to complete the resonant cavity required for laser operation.

A beam splitting mirror 22 was provided to measure power output at a meter 24 while recording the laser beam profile with a detector 26. Pumping power provided by the semiconductor laser array 14 was focused by lenses $L_1$ and $L_2$ into the end of the crystal rod 12. The low temperature necessary for this Er,Tm,Ho:YLF crystal rod 12 was regulated at 77° K. by liquid nitrogen (LN$_2$) flowing through a thermal conductor 28 surrounding the crystal rod 12.

For this experiment, the crystal rod 12 was grown from yttrium lithium fluoride doped with 50% Er, 12% Tm, and 1% Ho. The pump radiation was provided by a GaAlAs diode laser array 14 (model SDL-2420-C) which can operate with cw output power of up to 200 mW. The diode laser array was mounted on a Peltier cooler in a vacuum chamber and could be tuned in wavelength from 784 to 794 nm. The crystal rod absorption band around 790 nm was about 6 nm wide (at 77° K.) and well overlapped the 1 nm spectral width of the pump laser. The dual-lobed output of the pump laser was collimated with a 6.5 mm focal length 0.61 numerical aperture lens $L_1$ and focused into the crystal rod 12 with a 25 mm focal length lens $L_2$. The reflecting mirror 20 was formed as a planoconcave output coupler by a 5-cm radius of curvature with reflectance of 95% at ~2.1 $\mu$m wavelength. The mirror 20 could have been formed directly on the end of the laser crystal as well. Since the holmium lower laser level ($^5I_8$) is only 300 cm$^{-1}$ above the ground state, the crystal 12 was cooled to about 77° K. (measured at the crystal holder) to lower the lasing threshold. The infrared output radiation was detected using a HgCdTe detector.

Figure 2:
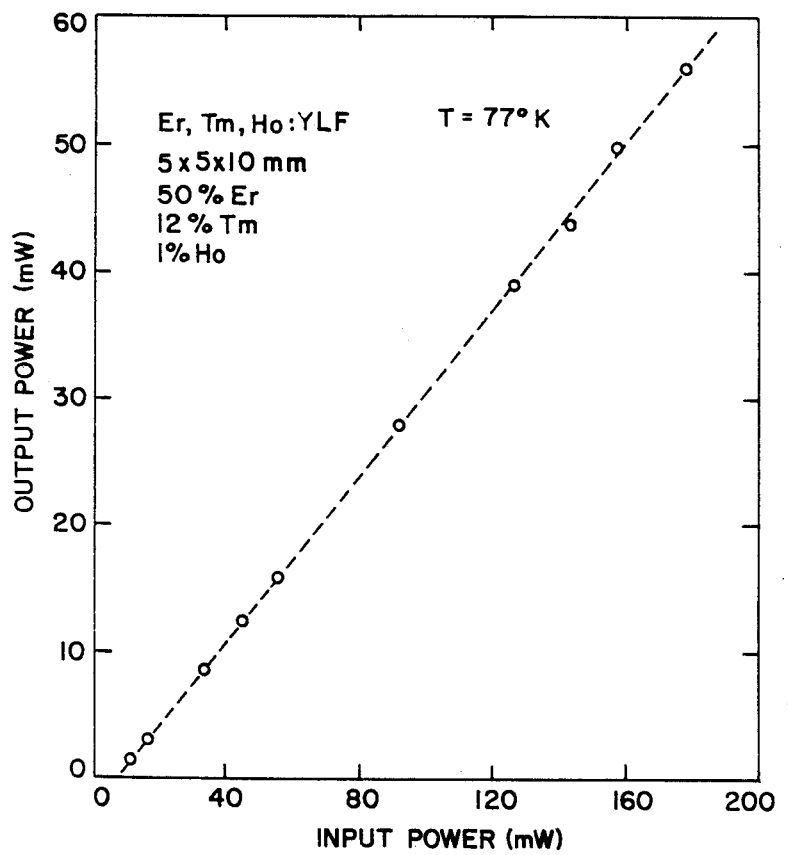
FIG. 2 is a graph of output power of the Er,Tm,Ho:YLF laser rod shown in FIG. 1 as a function of the cw laser input power at a temperature of 77° K.

Approximately 175 mW of laser array output was collected and delivered to the Er,Tm,Ho:YLF crystal by the lenses $L_1$ and $L_2$. With the pump wavelength tuned to 792 nm for maximum absorption, 56 mW of cw laser emission in TEm$_{00}$ mode was obtained from the crystal 12 at 2.1 $\mu$m. FIG. 2 shows the Er,Tm,Ho:YLF laser output power as a function of the incident optical pump power. The measured optical-to-optical conversion slope efficiecy of 33% was quite near the quantum efficiency of 38% for laser power output at 2.1 $\mu$m pumped at 0.792 nm. Not considering the power consumed by the Peltier cooler, the electrical-to-optical conversion efficiency for the semiconductor laser pumped Er,Tm,Ho:YLF crystal rod is 6.6%. Some evidence of pump laser heating of the crystal 12 was observed. When the pump laser beam was temporarily interrupted and then resumed, the Er,Tm,Ho:YLF laser output power rose to 62 mW, but within minutes stabilized at 56 mW. This effect is thought to depend on the concentration of sensitizers and impurities in the host YLF crystal rod 12.

The Er,Tm,Ho:YLF laser output power was highly sensitive to the alignment of output coupler 20, the crystal rod temperature and the wavelength of the pump laser. Efficient laser emission was obtained with a pump laser wavelength in the 784–792 nm range. To investigate the temperature behavior of the laser 10, the crystal rod temperature was slowly raised from 77° K. to about 300° K. For this unoptimized experimental setup, cooling of the Er,Tm,Ho:YLF crystal rod to temperatures below 124° K. was required to maintain laser oscillation. The higher than expected lasing threshold (7 mW of input power) indicated that several improvements in the laser were possible. These include elimination of the Dewar window 18a in the laser cavity by extending the vacuum chamber 18 to include the mirror 20 in place of the Dewar window, more uniform cooling of the crystal, proper mode matching of the pump laser-diode array to the crystal cavity, optimization of the output coupler reflectivity, and variations in the concentration of Ho and the sensitizers Er and Tm.

In operation of the Er,Tm,Ho:YLF laser, a portion of the pumped energy is lost through upconversion in the sensitizer system, namely the combination of 50% Er and 12% Tm sensitizers with 1% Ho activator in the YLF host material. The sensitizers were included for efficient energy transfer to the Ho activator by the Tm ions following absorption of the pump radiation energy by Er ions. Elimination of Er ions as sensitizers in accordance with the present invention, and use of lower concentrations of Tm and Ho ions, compared with what was used in the prior-art experiment, assists in efficient laser operation at ambient room temperture.

Figure 3:
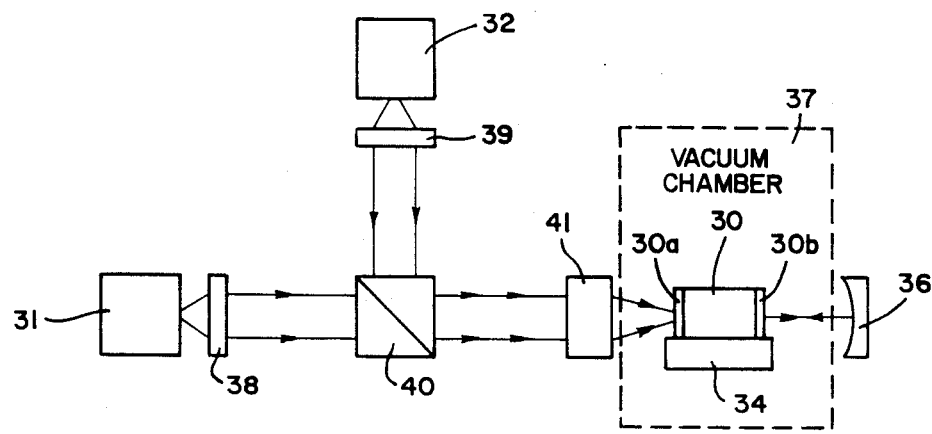
FIG. 3 illustrates schematically a setup for an efficient, compact Tm,Ho:YLF laser rod that operates efficiently at room temperature with an end-pump diode laser array in accordance with the present invention.

FIG. 3 illustrates a schematic diagram of an experimental setup for the Ho:YLF laser of the present invention utilizing a Tm,Ho:YLF crystal rod 30 optically pumped by a pair of cw semiconductor laser arrays 31, 32. Both ends 30a and 30b of the crystal 30 were polished flat, and the pumped end 30a of the crystal was coated for high reflectance inside the crystal rod and high transmittance at around 790 nm, while the other end 30b was antireflectance coated at 2 $\mu$m. The crystal rod 30 was mounted on a temperature controller 34 to maintain a known fixed temperature. A partially reflecting (95% to 99%) mirror 36 with 5 cm radius of curvature was provided outside of a vacuum chamber 37 to complete the resonant cavity required for laser operation. This mirror (coupler) 36 could be formed directly on the end 30b of the rod crystal as well.

Pumping power provided by each of the semiconductor laser arrays 31, 32 was collimated with 6.5 mm focal length 0.61 numerical aperture lens combination 38, and 39 and their output power was summed through a polarizing beamsplitter 40 and focused into one end 30a of the Tm,Ho:YLF crystal rod 30 by focusing optics 41 which use a 25 mm focal length lens. The output beam polarization of one of the semiconductor lasers was oriented 90° relative to the other laser by physically rotating it, for example, by rotating the laser 32 exactly 90° so that it is polarized vertically while the laser 31 is polarized horizontally. With the polarization of the diode laser 31 oriented horizontally, passing it through the polarizing beamsplitter 40 rotates it 90° to vertically polarized light. This allowed the beam from the laser 31 to be added to the vertically polarized light of the laser 32, and the sum was directed through the lens 41 into the crystal rod 30. This essentially increased the input power into the crystal rod 30 over that used for the prior-art experiment by a factor of two.

Figure 4:
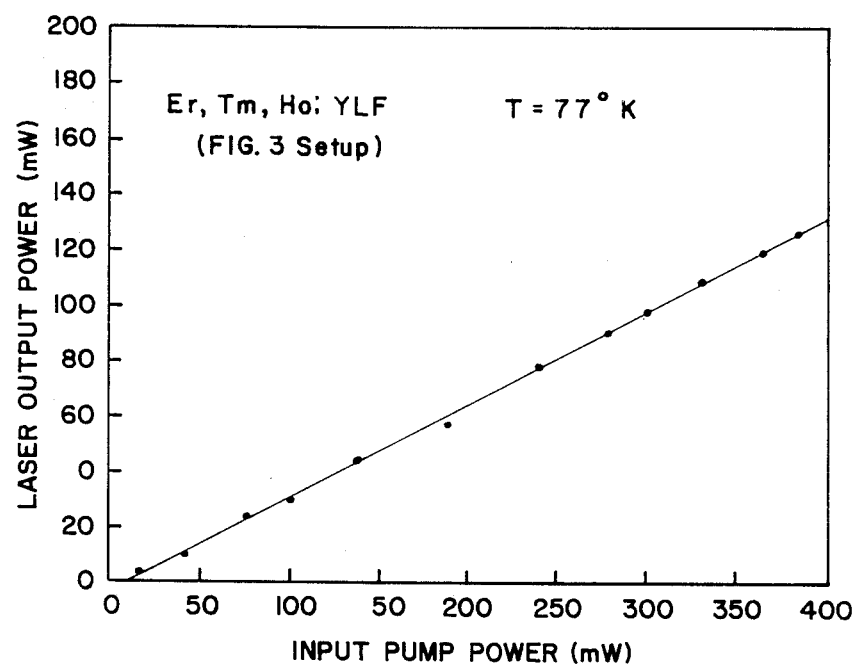
FIG. 4 is a graph of power output as a function of the laser input power of the Er,Tm,Ho:YLF laser rod shown in FIG. 1 operating in the setup of FIG. 3 at room temperature.

The temperature of the Tm,Ho:YLF crystal rod 30 was regulated by the temperature controller 34. For comparison with the new crystal rod 30, an Er,Tm,Ho:YLF crystal rod one centimeter long was first tested with this new setup using the combined pump power of the two laser arrays. Approximately 360 mW output from each of the 790 nm semiconductor laser arrays was collected and delivered to the crystal rod by the collimating lenses 38, 39 and focusing lens 41. The pump output was tuned to the proper wavelength for maximum absorption around 790 nm. Optimum 2.1 μm laser output power of 132 mW for a 1 cm long crystal held at 77° K. was obtained. FIG. 4 shows the Er,Tm,Ho:YLF laser output power as a function of the incident pump power in this setup for the second experiment. Not considering the power consumed by the temperature controller 34, the electrical-to-optical conversion efficiency for the laser diode pumped Er,Tm,Ho:YLF laser was about 30%. Single spatial mode laser emission was obtained for the solid-state crystal laser despite the dual-lobed nature of the semiconductor pump laser.

Figure 5:
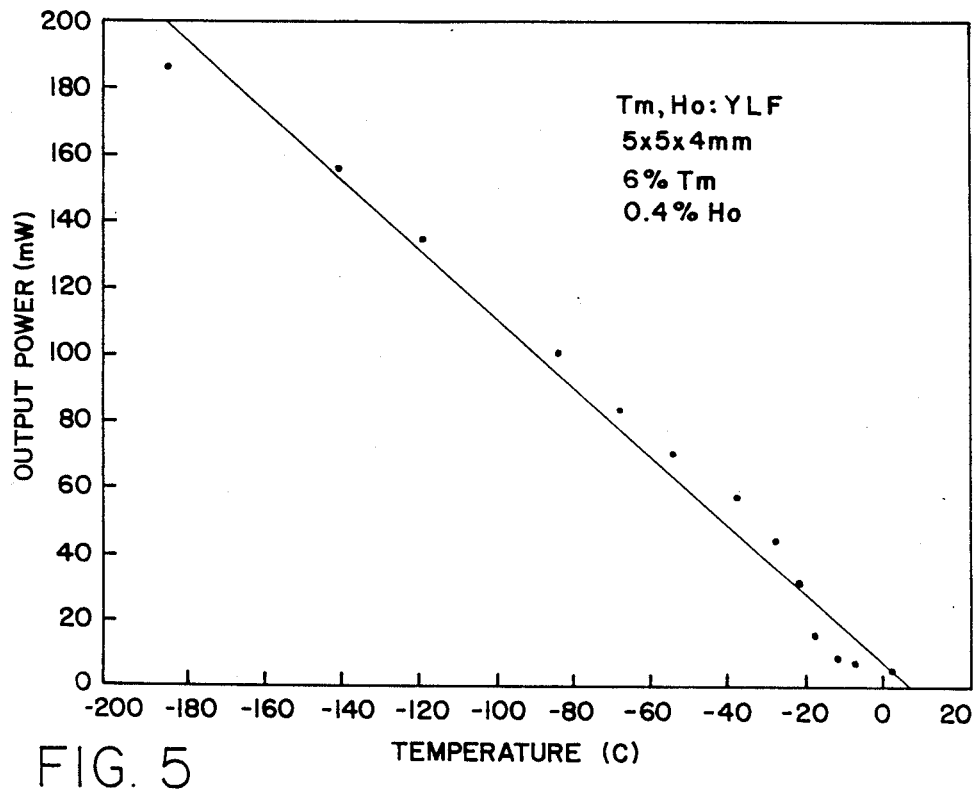
FIG. 5 is a graph of power output as a function of the absorbed power of a 4-mm Tm,Ho:YLF laser shown in FIG. 3.
Figure 6:
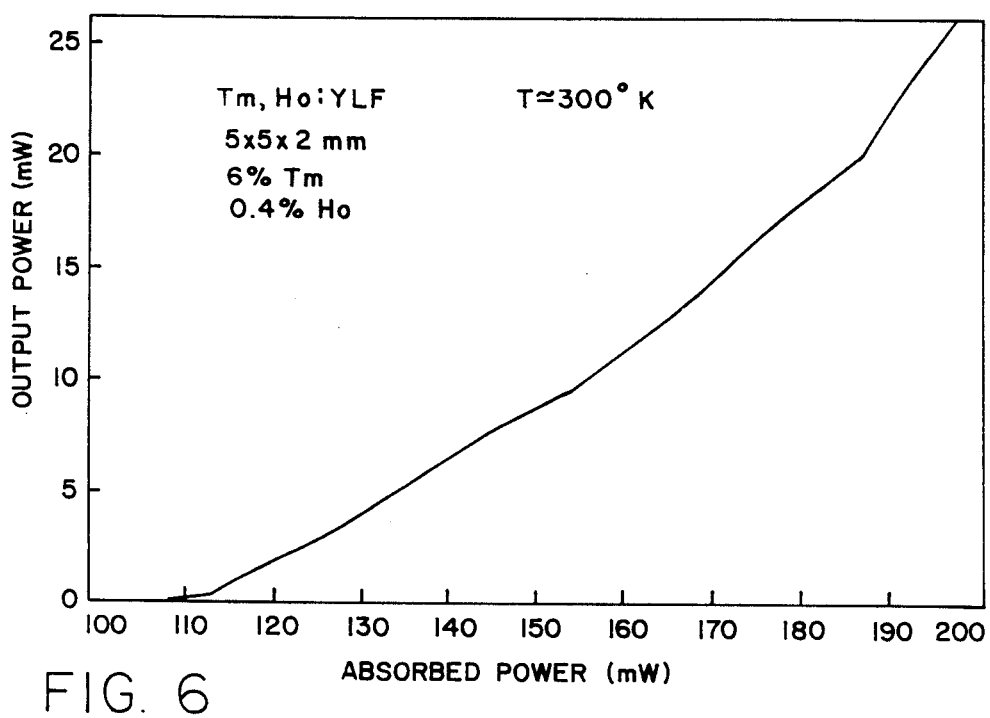
FIG. 6 is a graph of laser output power as a function of the laser crystal temperature for a 2-mm Tm,Ho:YLF.

In the present invention, namely the Tm,Ho:YLF laser tested with the setup for the second experiment, it was found that by changing the concentrations of both Tm and Ho ions to 6% and 0.4% by weight, laser operation at room temperature could be obtained. A 4 mm long Tm,Ho:YLF crystal gave about 182 mW with pump-to-output slope efficiency of 68% when its temperature was lowered to 77° K., as shown in FIG. 5. Cross relaxation processes between the ions results in emission of two photons for every photon absorbed, and thereby enhances the efficiency. Using the setup shown in FIG. 3, as much as 26 mW of laser radiation was obtained at room temperature with wavelength of 2.067 mm from a 2 mm long Tm,Ho:YLF crystal. FIG. 6 shows a plot of the crystal laser output power as a function of the absorbed pump power for a 2 mm long Tm,Ho:YLF crystal at room temperature with a conversion efficiency of 9%.

In the two Tm,Ho:YLF experiments referred to above, the dimensions of the two crystal rods were 5×5×2 mm and 5×5×4 mm long, and both included 0.4% Ho activator and 6% Tm sensitizer by weight. It was thus demonstrated for the first time that operation of a Tm,Ho:YLF crystal laser at room temperature is possible, provided that the length of the rod be shorter (2 mm) than the rod used for a liquid nitrogen cooled crystal (10 mm).

Although a particular embodiment of the invention has been described and illustrated herein, it is recognized that modifications and variations may readily occur to those skilled in the art. These modifications and variations include, by way of example without limitation, selection of concentrations of Ho and Tm as the activator and the sensitizer, respectively, mode matching of the pump laser into the YLF cavity, optimization of the crystal length, optimization of the activator and sensitizer concentrations, and optimization of the output coupler reflectivity. The results that are achieved with this type of pumped miniature Tm,Ho:YLF crystal laser are very significant, particularly since these results are practical for general applications at room temperature, such as for optical communications, remote sensing, and medical instrumentation. The unexpectedly high efficiency of the Tm,Ho:YLF laser is also a major improvement. Consequently, it is intended that the claims be interpreted to cover such modifications and variations.

I claim:

1. A crystal laser optically pumped with low-level pump power for operation with very high optical-to-optical conversion efficiency of pump power to laser output power consisting essentially of
   a yttrium lithium fluoride host crystal rod having
      a length not greater than about 4 mm,
      a holmium activator, and
      a sensitizer consisting of only thulium,
   wherein holmium and thulium are provided in said crystal in concentrations of 0.4 % and 6% by weight, and including
   means for low-level power pumping of said crystal,
   a resonant cavity, and
   optical energy extracting means.

2. A crystal laser as defined in claim 1 including means for regulating the temperature of said crystal at about 300° K.

3. A crystal laser as defined in claim 1 including means for regulating the temperature of said crystal at about 77° K.

4. A crystal laser as defined in claim 1 wherein said means for low-level power pumping of said crystal is comprised of a semiconductor diode laser.

5. A crystal laser as defined in claim 1 wherein said means for low-level power pumping of said crystal is comprised of a plurality of semiconductor diode lasers and means for combining light from said plurality of semiconductor diode lasers with the same polarization to effectively combine the pump power supplied to said crystal from said plurality of semiconductor diode lasers.

6. A crystal laser as defined in claim 1 wherein holmium and thulium are provided in said crystal in concentrations of 0.4% and 6% by weight.

7. A crystal laser as defined in claim 6 including means for cooling said crystal for operation at a temperature below about 300° K.

8. A crystal laser as defined in claim 6 including means for regulating the temperature of said crystal at about 300° K.

9. A crystal laser as defined in claim 6 including means for regulating the temperature of said crystal at about 77° K.

10. A crystal laser as defined in claim 6 wherein said crystal rod is of a length not greater than about 2 mm.

11. A crystal rod as defined in claim 6 wherein said crystal rod is of a length not greater than about 2 mm.

12. A crystal laser optically pumped with low-level pump power for operation with very high optical-to-optical conversion efficiency of pump power to laser output power over a range of about 77° K. to about 300° K. consisting essentially of a yttrium lithium fluoride host crystal rod having a length not greater than about 4 mm, a holmium activator, and a sensitizer consisting of only thulium, wherein holmium and thulium are provided in said crystal in concentrations of 0.4% and 6% by weight, and including means for low-level pumping of said crystal, a resonant cavity, means for cooling said crystal for operation at a temperature between about 77° K. and about 300° K. and optical energy extraction means.

* * * * *